(12) United States Patent
Karstens

(10) Patent No.: US 8,091,041 B2
(45) Date of Patent: *Jan. 3, 2012

(54) IDENTIFYING GROUPED TOOLBAR ICONS

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 991 days.

This patent is subject to a terminal disclaimer.

(21) Appl. No.: 11/868,191

(22) Filed: Oct. 5, 2007

(65) Prior Publication Data

US 2009/0094554 A1    Apr. 9, 2009

(51) Int. Cl.
*G06F 3/048* (2006.01)
(52) U.S. Cl. ........ 715/810; 715/825; 715/821; 715/828; 715/711; 715/708; 715/842; 345/651
(58) Field of Classification Search .................. 715/810, 715/821, 711, 779, 842
See application file for complete search history.

(56) References Cited

U.S. PATENT DOCUMENTS 6,177,941 B1 * 1/2001 Haynes et al. ................ 715/810
2008/0307358 A1 * 12/2008 Hintermeister et al. ...... 715/821

OTHER PUBLICATIONS

Mircosoft Word (2003; Copyright 1983-2003).*

* cited by examiner

*Primary Examiner* — William L Bashore
*Assistant Examiner* — Sherrod Keaton
(74) *Attorney, Agent, or Firm* — Yudell Isidore Ng Russell PLLC

(57) ABSTRACT

A method of identifying grouped toolbar icons. An application program displays a graphical user interface (GUI) that includes multiple toolbar icons. The application iteratively determines whether or not a graphical cursor is in proximity to a first toolbar icon. If the cursor is in proximity to the first icon, the application identifies one or more additional related icons, which are currently displayed and are included in a same pre-defined toolbar icon group as the first icon, and displays a graphical border that surrounds the first icon and the related icons. If the related icons are not adjacent to each other, multiple separate borders are displayed. The application displays a first identification tab in close proximity to the border. The first tab includes a toolbar group name and an icon name of the first icon. The application may also display a second tab that includes descriptive properties of the first icon.

6 Claims, 4 Drawing Sheets

US 8,091,041 B2

IDENTIFYING GROUPED TOOLBAR ICONS

RELATED APPLICATION

The present invention is related to the subject matter of U.S. application Ser. No. 11/868,156, entitled, "Method and System for Enveloping a Group of Toolbar Icons," filed on Oct. 5, 2007. The content of the related application is incorporated herein by reference.

BACKGROUND OF THE INVENTION

The present invention relates in general to data processing systems and in particular to graphical user interfaces (GUIs) within application programs that include toolbar icons.

Computer application programs may utilize a GUI that includes one or more toolbars. Each toolbar may include multiple icons, each of which represents a function performed by the application program (e.g., saving, printing, and changing text size). Conventional application programs, such as word processors or internet browsers, include configurable toolbars. In an application program, toolbars typically include different groups of icons based on functionality (e.g., file-related functions, drawing-related functions, and text-related functions). Users can manually move toolbars from their default locations to custom locations in the application area that houses toolbars. Sometimes a toolbar's default location is determined by the toolbars currently displayed.

Due to the large number and variety of icons included in toolbars and the many combinations of locations toolbars may be found, users of application programs can experience difficulty in quickly determining which icons belong to which toolbars. Users may also have problems efficiently determining which icons will disappear from the GUI of an application program if one or more toolbars are de-selected from a list of currently displayed toolbars. Similarly, users may not remember the name of a toolbar that includes an icon. For example, if a first user wants to add an icon that is visible in a toolbar on a second computer that is being used by a second user, but the second user does not remember the name of the toolbar that includes the icon, the first user will not be able to easily determine how to locate and/or display the icon on the first computer.

SUMMARY OF AN EMBODIMENT

Disclosed are a method, system, and computer program product for identifying grouped toolbar icons. In a data processing system having a processor and a display device, an application program displays a graphical user interface (GUI) that includes multiple toolbar icons. The application program iteratively determines, via the processor, whether or not a graphical cursor is in proximity to a first toolbar icon among the toolbar icons included in the GUI. If the graphical cursor is in proximity to the first toolbar icon, the application identifies one or more additional related icons, which are currently displayed and are included in a same pre-defined toolbar icon group as the first icon, and displays a graphical border that surrounds the first icon and the one or more additional related icons. If the one or more additional related icons are not adjacent to each other, multiple separate borders are displayed. The application program displays a first identification tab in close proximity to the graphical border. The first identification tab includes a toolbar group name corresponding to the pre-defined toolbar icon group and an icon name of the first toolbar icon. The application program may also display a second identification tab that includes descriptive properties of the first toolbar icon. The second identification tab is displayed in close proximity to the graphical border in response to a determination that the graphical cursor is in proximity to the first toolbar icon. The second identification tab includes a shortcut to a graphical menu of the first toolbar icon.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer program product for identifying grouped toolbar icons.

Figure 1:
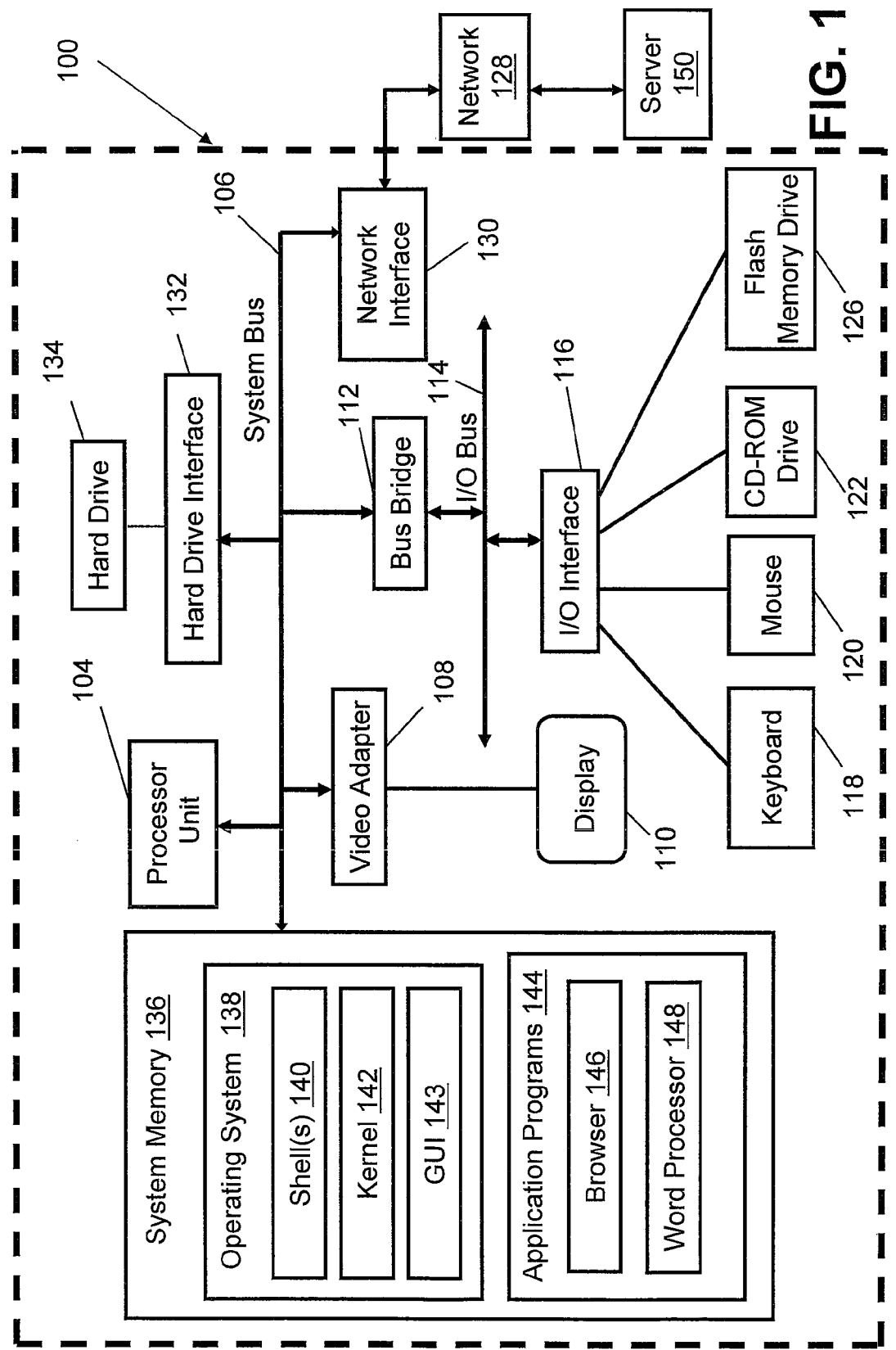
FIG. 1 depicts a high level block diagram of an exemplary computer, according to an embodiment of the present invention.

With reference now to FIG. 1, there is depicted a block diagram of an exemplary computer 100, with which the present invention may be utilized. Computer 100 includes processor unit 104 that is coupled to system bus 106. Video adapter 108, which drives/supports display 110, is also coupled to system bus 106. System bus 106 is coupled via bus bridge 112 to Input/Output (I/O) bus 114. I/O interface 116 is coupled to I/O bus 114. I/O interface 116 affords communication with various I/O devices, including keyboard 118, mouse 120, Compact Disk-Read Only Memory (CD-ROM) drive 122, and flash memory drive 126. The format of the ports connected to I/O interface 116 may be any known to those skilled in the art of computer architecture, including but not limited to Universal Serial Bus (USB) ports.

Computer 100 is able to communicate with server 150 via network 128 using network interface 130, which is coupled to system bus 106. Network 128 may be an external network such as the Internet, or an internal network such as a Local Area Network (LAN), an Ethernet, or a Virtual Private Network (VPN). In one embodiment, server 150 is configured similarly to computer 100.

Hard drive interface 132 is also coupled to system bus 106. Hard drive interface 132 interfaces with hard drive 134. In one embodiment, hard drive 134 populates system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Data that populates system memory 136 includes Operating System (OS) 138 and application programs 144.

OS 138 includes shell 140, for providing transparent user access to resources such as application programs 144. Generally, shell 140 (as it is called in UNIX(®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes graphical user interface (GUI) 143 and kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include browser 146 and word processor 148. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. According to the illustrative embodiment, word processor 148 performs the functions illustrated in FIG. 3, which is described below. In an alternate embodiment, another one of application programs 144, such as browser 146, may perform the functions illustrated in FIG. 3. In another embodiment, OS 138 may perform the functions illustrated in FIG. 3.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

Figure 2A:
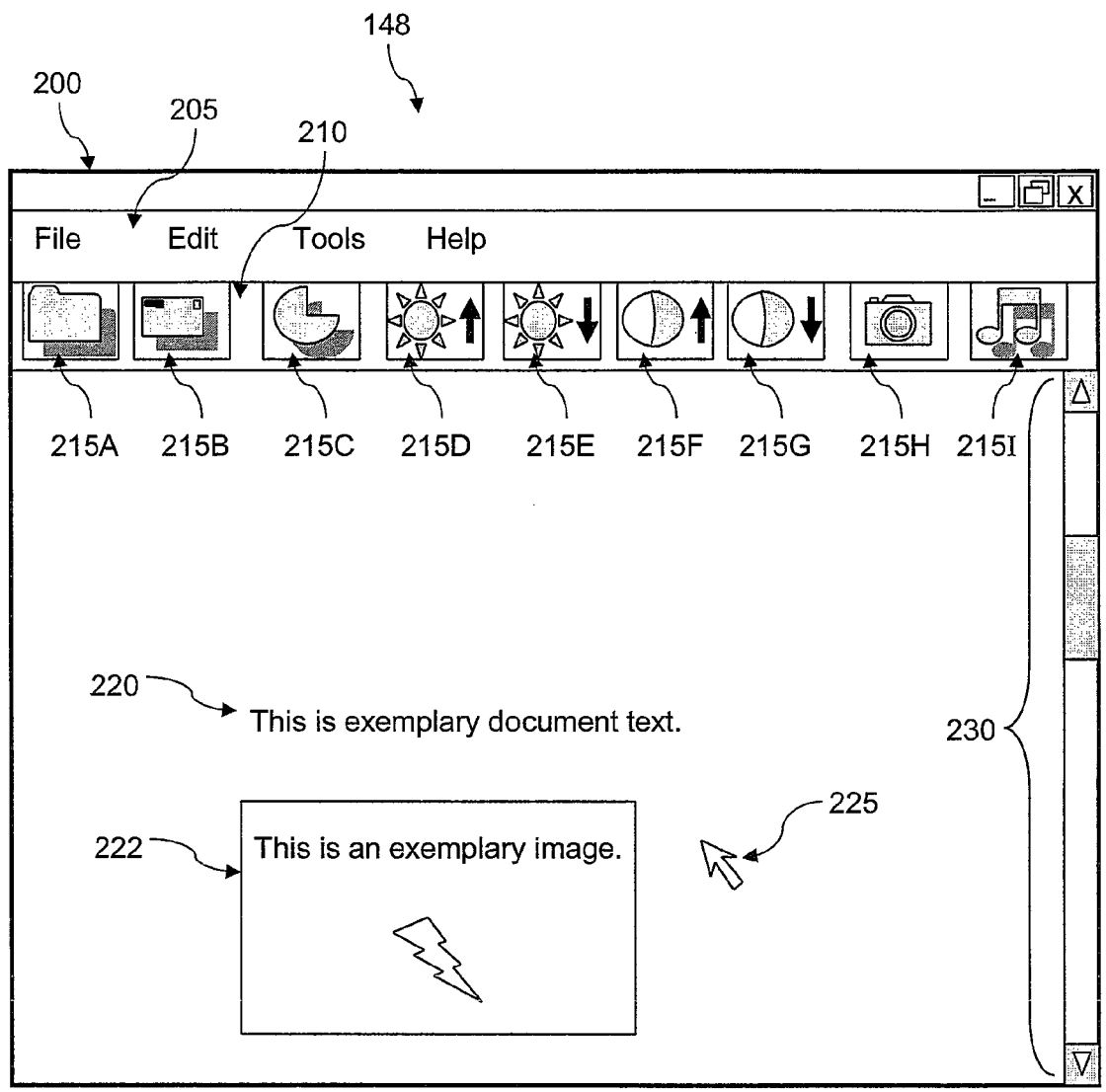
FIG. 2A illustrates a first view of an exemplary graphical user interface (GUI), according to an embodiment of the present invention.

With reference now to FIG. 2A, there is depicted an exemplary GUI of word processor 148 (FIG. 1), according to an embodiment of the present invention. As shown, GUI 143 (FIG. 1) includes display window 200, window control bar 205, and toolbar 210. Window control bar 205 includes one or more pull down menus (e.g., a "file" menu). Similarly, toolbar 210 includes multiple toolbar icons 215A-I, including, but not limited to, open file icon 215A, email file icon 215B, insert chart icon 215C, increase brightness icon 215D, decrease brightness icon 215E, increase contrast icon 215F, decrease contrast icon 215G, insert picture icon 215H, and insert audio icon 215I.

Toolbar icons 215A-I may be included in one or more pre-defined toolbar icon groups. Each toolbar icon group contains multiple similar icons, which are grouped based on functionality (e.g., picture-related icons and file management icons). In one embodiment, a user of word processor 148 may select multiple icons to create a user-defined toolbar icon group. Word processor 148 initially displays one or more pre-defined default icons from a pre-defined icon group, and all icons and/or groups may not be displayed using GUI 143 (FIG. 1). A user of word processor 148 may selectively add and/or remove icons from a list of icons currently displayed on toolbar 210. In one embodiment, a user may select multiple icons from different toolbar icon groups to create a "virtual group" of icons. Each icon within a toolbar icon group may be displayed side-by-side or non-adjacent locations on toolbar 210.

According to the illustrative embodiment, word processor 148 displays data, including document text 220 and/or image 222. A user of word processor 148 may view multiple pages of document text 220 and/or images 222 in a document by adjusting scroll bar 230. A user of browser 146 may manipulate document text 220 and/or images 222 by providing input from keyboard 118 or by using cursor 225 to "mouse over" and click on a toolbar icon. As utilized herein, a "mouse over" refers to a movement of mouse 120 (FIG. 1) that causes cursor 225 to enter a pre-defined area within close proximity to (e.g., to "hover over") a toolbar icon.

Figure 2B:
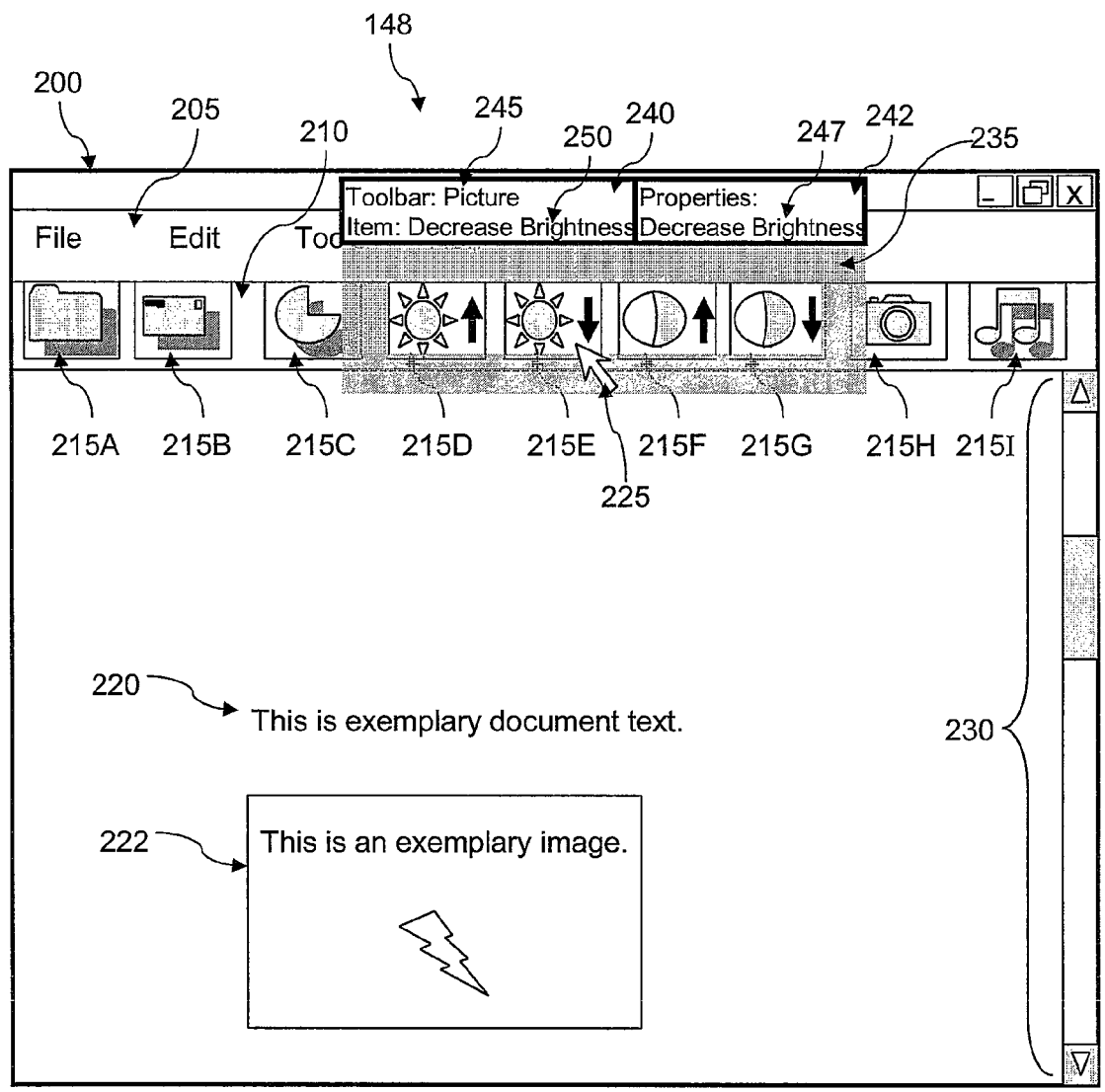
FIG. 2B illustrates a second view of the exemplary GUI of FIG. 2A, according to an embodiment of the present invention.

With reference now to FIG. 2B, there is depicted a second view of the GUI of FIG. 2A, according to an embodiment of the present invention. As shown, a user of word processor 148 (FIG. 1) has used mouse 120 to position cursor 225 in close proximity to decrease brightness icon 215E. In response to cursor 225 hovering over decrease brightness icon 215E, word processor 148 displays border 235 around one or more currently displayed toolbar icons that correspond to the same toolbar icon group as decrease brightness icon 215E (e.g., a "picture" toolbar group). Border 235 includes a distinguishable line and/or shaded area surrounding increase brightness icon 215D, decrease brightness icon 215E, increase contrast icon 215F, and decrease contrast icon 215G. In one embodiment, border 235 may be a rectangular shape/area shaded with a partially transparent color that is easily distinguishable from the background of window 200 and/or the icons on toolbar 210 (e.g., light gray).

In an alternate embodiment, border 235 may be opaque. Similarly, border 235 may be a thin colored line that surrounds the toolbar icon group. In another embodiment, each icon in a toolbar icon group may be highlighted rather than being surrounded by border 235. If one or more currently displayed icons in a toolbar icon group are not located adjacent to other icons in the same group (i.e., one or more icons are "isolated" from other icons in the same group), a separate border 235 having the same color, shading, and/or line thickness may be displayed to identify the isolated icon(s).

In another embodiment, border 235 may be displayed around the currently visible icons corresponding to a toolbar icon group and/or border 235 may flash (i.e., blink) a predefined number of times when cursor 225 hovers over an entry in a toolbar pull-down menu in window control bar 205 that corresponds to the name of the toolbar icon group. If one or more toolbar icons in the toolbar icon group are covered by other graphical elements, such as the toolbar pull-down menu, the covered items will temporarily flash through to the topmost layer of GUI 143 (FIG. 1) for location identification purposes. When cursor 225 hovers over an entry in a toolbar pull-down menu that includes the names of one or more icons in a toolbar icon group, a graphical image of each toolbar icon in the group is immediately displayed in proximity to (e.g., to the side of) the textual name of each icon. If cursor 225 hovers over an entry in a toolbar pull-down menu and selects (i.e., clicks on) an entry that corresponds to a toolbar icon that is not currently displayed in window 200, the toolbar icon corresponding to the selected entry may be displayed in proximity to the pull-down menu and move in an animated fashion from the pull-down menu to a location on toolbar 210. Once a newly-selected toolbar icon moves to toolbar 210, border 235 may flash a pre-defined number of times.

According to the illustrative embodiment, border 235 includes at least first identification tab 240, which includes toolbar name 245 (e.g., "Picture") that corresponds to the toolbar group of the moused-over icon. First identification tab 240 also includes item name 250 (e.g., "Decrease Brightness"), which corresponds to the name of the moused-over decrease brightness icon 215E. In one embodiment, border 235 may also include second identification tab 242, which includes properties field 247. Properties field 247 includes descriptive information corresponding to the function(s) of the moused-over icon. In an alternate embodiment, properties field 247 may also include a shortcut to a menu of the moused-over icon.

Figure 3:
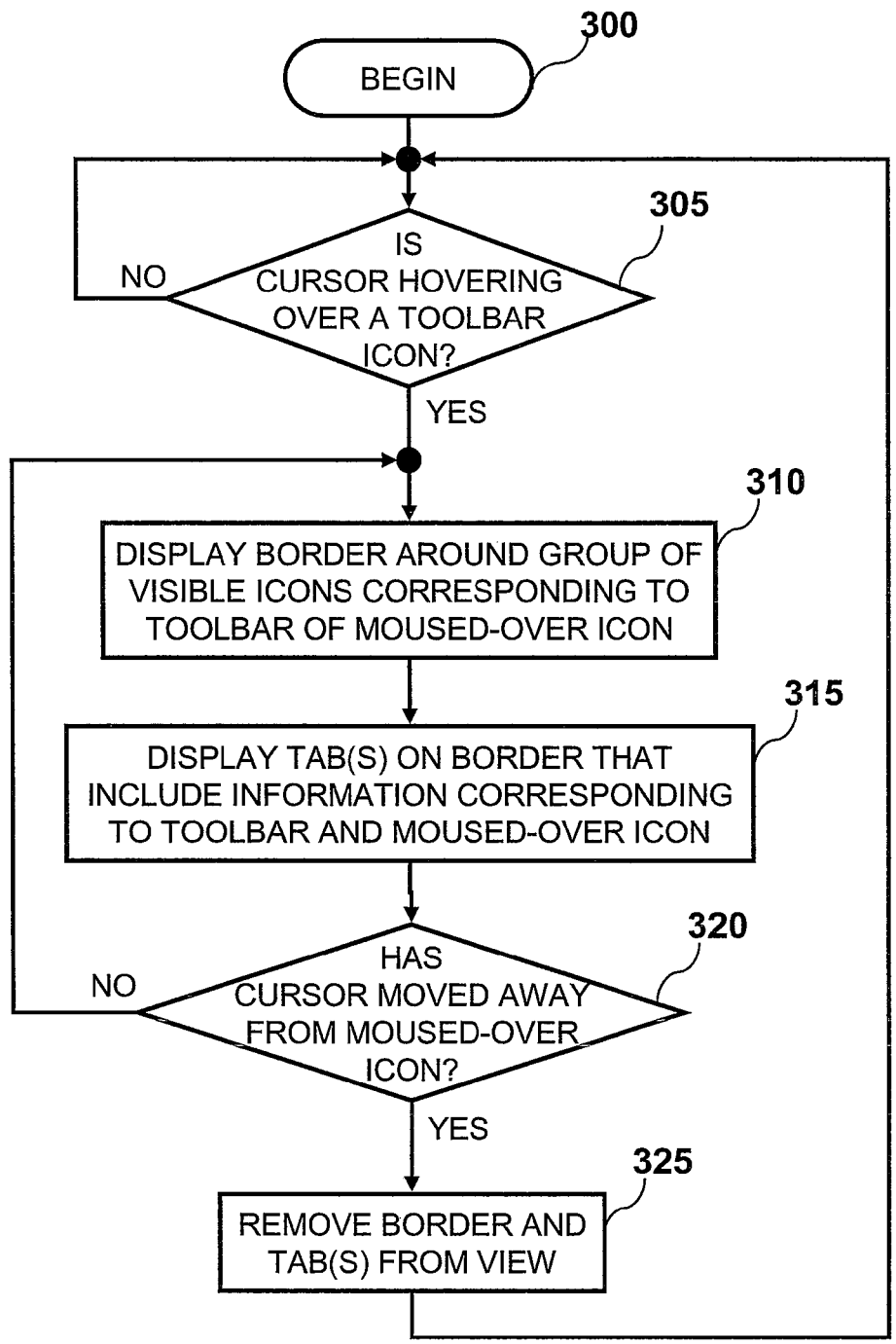
FIG. 3 is a high level logical flowchart of an exemplary method of identifying grouped toolbar icons, according to an embodiment of the invention.

Turning now to FIG. 3, there is illustrated a high level logical flowchart of an exemplary method of identifying grouped toolbar icons, according to an embodiment of the invention. The process begins at block 300 in response to one of application programs 144 (FIG. 1), such as word processor 148, using GUI 143 to display a window that includes one or more toolbars. At block 305, word processor 148 determines whether or not cursor 225 (FIGS. 2A-2B) is located in close proximity to (i.e., hovering over) a toolbar icon. If cursor 225 is not hovering over a toolbar icon, the process returns to block 305.

If cursor 225 is hovering over a toolbar icon, word processor 148 displays border 235 (FIG. 2B) around one or more related icons that correspond to the same toolbar icon group as the moused-over icon, as depicted in block 310. Word processor 148 displays at least first identification tab 240 (FIG. 2B) in close proximity to border 235, as shown in block 315. Word processor may also display second identification tab 242 (FIG. 2B) in close proximity to border 235 and first identification tab 240.

At block 320, word processor 148 determines whether or not cursor 225 has moved away from the moused-over icon. If cursor 225 has not moved away from the moused-over icon (i.e., cursor 225 is still in close proximity to the moused-over icon), the process returns to block 310. If cursor 225 has moved away from the moused-over icon, word processor 148 removes border 235 and the corresponding identification tabs, such as first identification tab 240 and second identification tab 242, from view within window 200, as depicted in block 325, and the process subsequently returns to block 305.

The present invention thus provides a method of identifying grouped toolbar icons. An application program displays GUI 143 (FIG. 1) that includes multiple toolbar icons 215A-I (FIGS. 2A-2B). The application program iteratively determines whether or not a graphical cursor 225 (FIGS. 2A-2B) is in proximity to a first toolbar icon among the toolbar icons included in GUI 143. If the graphical cursor 225 is in proximity to the first toolbar icon, the application program displays a graphical border 235 (FIG. 2B) that surrounds the first toolbar icon and one or more additional related icons that are included in a same pre-defined toolbar icon group as the first toolbar icon. The application program displays first identification tab 240 (FIG. 2B) in close proximity to the graphical border 235. First identification tab 240 includes a toolbar group name 245 corresponding to the pre-defined toolbar icon group and an icon name 250 corresponding to the first toolbar icon. The application program may also display second identification tab 242 (FIG. 2B) that includes descriptive properties 247 corresponding to the first toolbar icon.

It is understood that the use herein of specific names are for example only and not meant to imply any limitations on the invention. The invention may thus be implemented with different nomenclature/terminology and associated functionality utilized to describe the above devices/utility, etc., without limitation.

In the flow chart (FIG. 3) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While an illustrative embodiment of the present invention has been described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a data processing system having a processor and a display device, a computer-implemented method comprising:
    displaying on the display device a graphical user interface (GUI) that includes a plurality of toolbar icons;
    iteratively determining, via the processor, whether or not a graphical cursor is in proximity to a first toolbar icon among the plurality of toolbar icons included in said GUI;
    in response to a determination that the graphical cursor is in proximity to said first toolbar icon:
        identifying one or more additional related icons that are included in a same pre-defined toolbar icon group as said first toolbar icon, wherein said one or more additional related icons are currently displayed in said GUI;
        displaying a graphical border that surrounds said first toolbar icon and said one or more additional related icons, wherein when said one or more additional related icons are not displayed adjacent to one another in said GUI a plurality of separate graphical borders are displayed;
        displaying a first identification tab in close proximity to said graphical border, wherein said first identification tab comprises a toolbar group name corresponding to said pre-defined toolbar icon group and an icon name corresponding to said first toolbar icon; and
        displaying a second identification tab in close proximity to said graphical border in response to a determination that the graphical cursor is in proximity to said first toolbar icon, wherein said second identification tab includes descriptive properties corresponding to said first toolbar icon, and wherein said second identification tab includes a shortcut to a graphical menu of said first toolbar icon.

2. The method of claim 1, further comprising displaying said graphical border around a plurality of related icons in response to a determination that the graphical cursor is in proximity to a toolbar pull-down menu item that corresponds to said plurality of related icons.

3. A computer system comprising:
    a processor;
    a system memory coupled to said processor; and
    an application program within said system memory that when executed by the processor causes the processor to:

display a graphical user interface (GUI) that includes a plurality of toolbar icons;

iteratively determine whether or not a graphical cursor is in proximity to a first toolbar icon among the plurality of toolbar icons included in said GUI;

in response to a determination that the graphical cursor is in proximity to said first toolbar icon:

identify one or more additional related icons that are included in a same pre-defined toolbar icon group as said first toolbar icon, wherein said one or more additional related icons are currently displayed in said GUI;

display a graphical border that surrounds said first toolbar icon and said one or more additional related icons, wherein when said one or more additional related icons are not displayed adjacent to one another in said GUI a plurality of separate graphical borders are displayed;

display a first identification tab in close proximity to said graphical border, wherein said first identification tab comprises a toolbar group name corresponding to said pre-defined toolbar icon group and an icon name corresponding to said first toolbar icon; and display a second identification tab in close proximity to said graphical border in response to a determination that the graphical cursor is in proximity to said first toolbar icon, wherein said second identification tab includes descriptive properties corresponding to said first toolbar icon, and wherein said second identification tab includes a shortcut to a graphical menu of said first toolbar icon.

4. The computer system of claim 3, wherein the application further causes the processor to display said graphical border around a plurality of related icons in response to a determination that the graphical cursor is in proximity to a toolbar pull-down menu item that corresponds to said plurality of related icons.

5. A computer program product comprising:
a recordable computer storage medium; and
program code on said recordable computer storage medium that when executed by a computer causes the computer to perform the functions of:

displaying a graphical user interface (GUI) that includes a plurality of toolbar icons;

iteratively determining whether or not a graphical cursor is in proximity to a first toolbar icon among the plurality of toolbar icons included in said GUI;

in response to a determination that the graphical cursor is in proximity to said first toolbar icon:

identifying one or more additional related icons that are included in a same pre-defined toolbar icon group as said first toolbar icon, wherein said one or more additional related icons are currently displayed in said GUI;

displaying a graphical border that surrounds said first toolbar icon and said one or more additional related icons, wherein when said one or more additional related icons are not displayed adjacent to one another in said GUI a plurality of separate graphical borders are displayed;

displaying a first identification tab in close proximity to said graphical border, wherein said first identification tab comprises a toolbar group name corresponding to said pre-defined toolbar icon group and an icon name corresponding to said first toolbar icon; and displaying a second identification tab in close proximity to said graphical border in response to a determination that the graphical cursor is in proximity to said first toolbar icon, wherein said second identification tab includes descriptive properties corresponding to said first toolbar icon, and wherein said second identification tab includes a shortcut to a graphical menu of said first toolbar icon.

6. The computer program product of claim 5, further comprising program code on said recordable computer storage medium that when executed by a computer causes the computer to perform the functions of displaying said graphical border around a plurality of related icons in response to a determination that the graphical cursor is in proximity to a toolbar pull-down menu item that corresponds to said plurality of related icons.

* * * * *